(12) United States Patent
Hirata

(10) Patent No.: US 7,630,824 B2
(45) Date of Patent: Dec. 8, 2009

(54) FUEL ESTIMATING DEVICE

(75) Inventor: Yasuo Hirata, Chita-gun (JP)

(73) Assignee: Denso Corporation, Kariya (JP)

(*) Notice: Subject to any disclaimer, the term of this patent is extended or adjusted under 35 U.S.C. 154(b) by 47 days.

(21) Appl. No.: 12/121,049

(22) Filed: May 15, 2008

(65) Prior Publication Data

US 2008/0312809 A1 Dec. 18, 2008

(30) Foreign Application Priority Data

Jun. 13, 2007 (JP) ............................. 2007-156571

(51) Int. Cl.
*G06F 17/00* (2006.01)
*F02B 13/00* (2006.01)

(52) U.S. Cl. .................. 701/105; 701/110; 123/436; 123/431

(58) Field of Classification Search ............. 123/1 A, 123/436, 492, 510, 511, 431, 575, 577; 701/105, 701/110

See application file for complete search history.

(56) References Cited

U.S. PATENT DOCUMENTS

| 4,945,881 | A | 8/1990 | Gonze et al. | |
| 7,401,591 | B2* | 7/2008 | Yamaguchi et al. | 123/299 |
| 7,480,557 | B2* | 1/2009 | Yamaguchi et al. | 701/104 |
| 2008/0312805 | A1* | 12/2008 | Hirata | 701/103 |
| 2009/0143959 | A1* | 6/2009 | Yamaoka et al. | 701/108 |

FOREIGN PATENT DOCUMENTS

JP 2007-120414 5/2007

* cited by examiner

*Primary Examiner*—Hai H Huynh
(74) *Attorney, Agent, or Firm*—Nixon & Vanderhye, PC

(57) ABSTRACT

A requested injection time InjT necessary for a fuel injector to inject a fuel per one combustion cycle is computed in response to a position of an accelerator manipulated by a driver, an injectable time InjMax per one combustion cycle is computed on the basis of an engine speed, and whether or not the requested injection time InjT is larger than the injectable time InjMax is determined. Then, when it is positively determined that the requested injection time InjT is larger than the injectable time InjMax, it is estimated that an alternate fuel (for example an alcohol fuel) other than a regular fuel (for example gasoline) is blended with a fuel in a fuel tank.

6 Claims, 13 Drawing Sheets

ENGINE SPEED : NE

INJECTION PERIOD

PUMP DRIVE DUTY RATIO

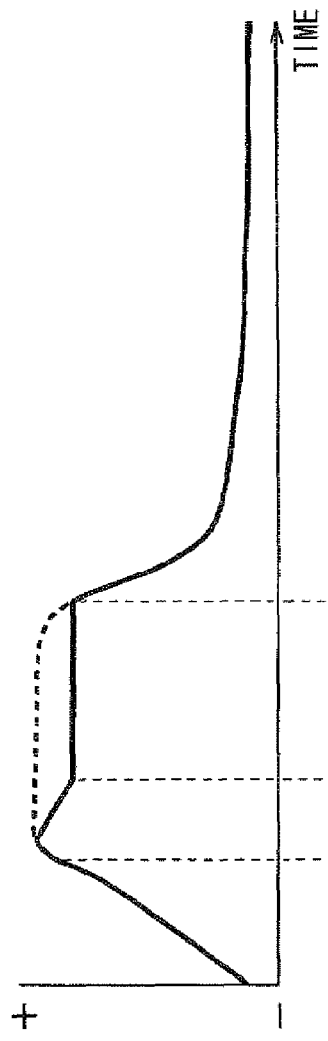
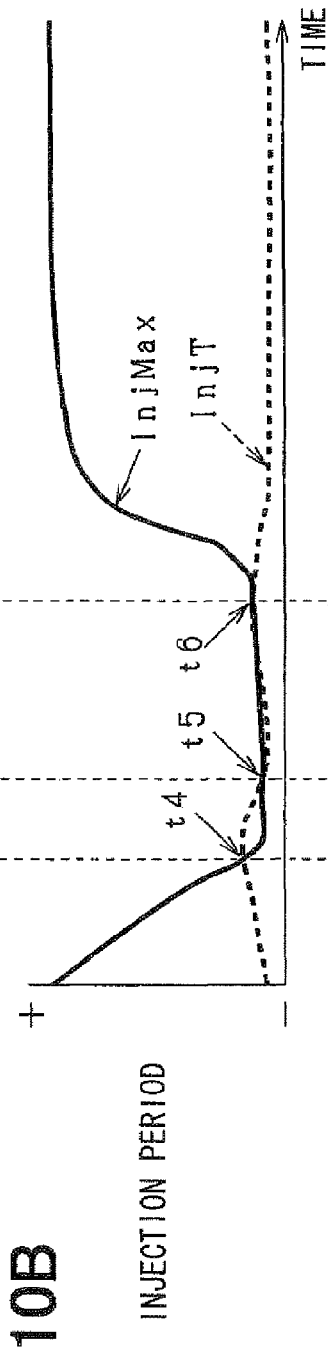
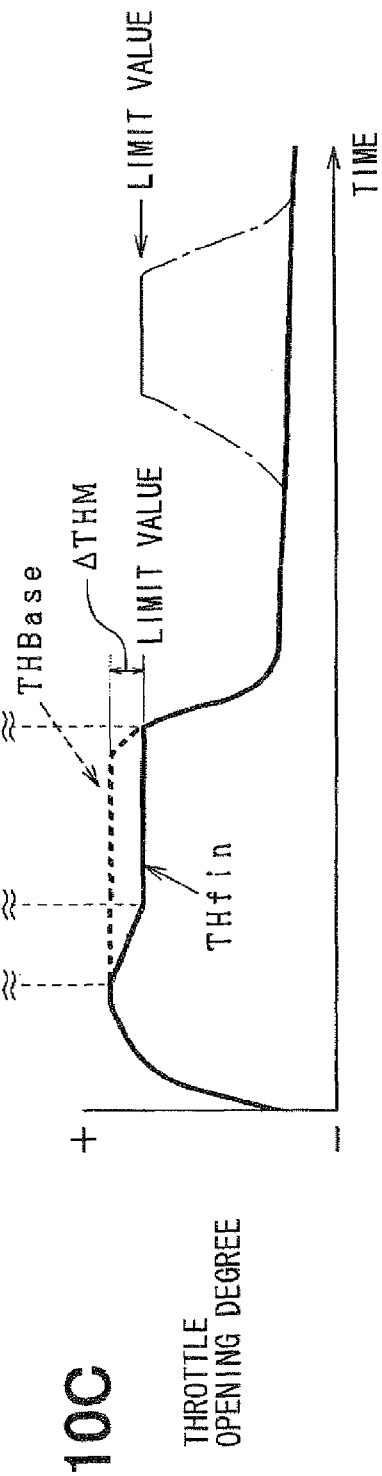

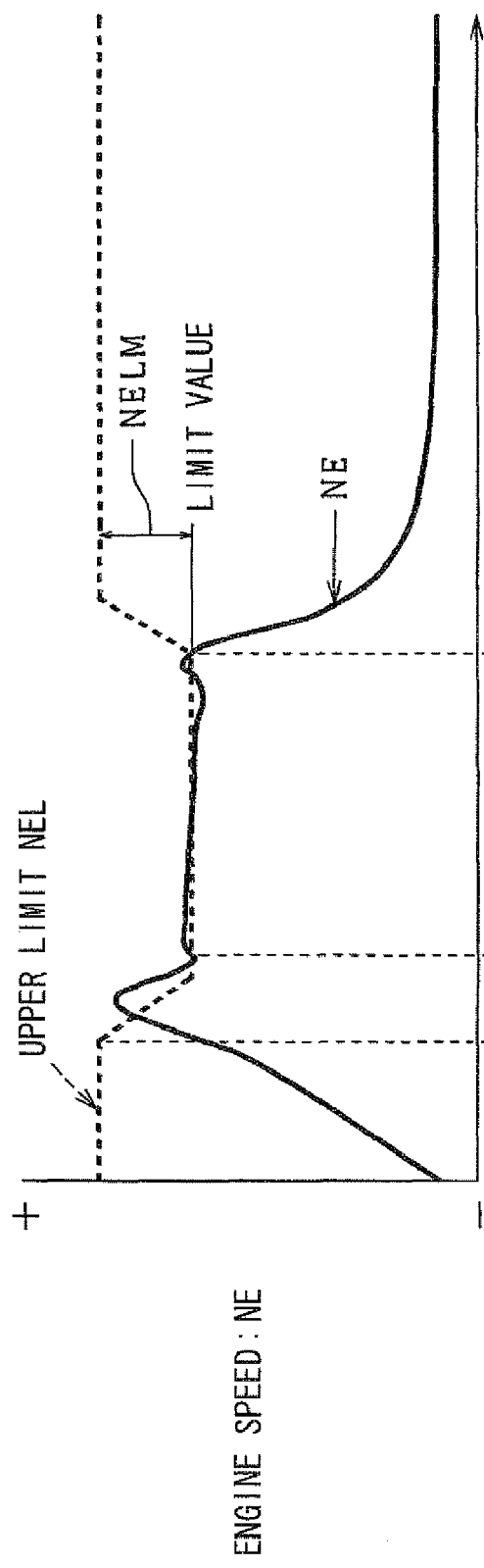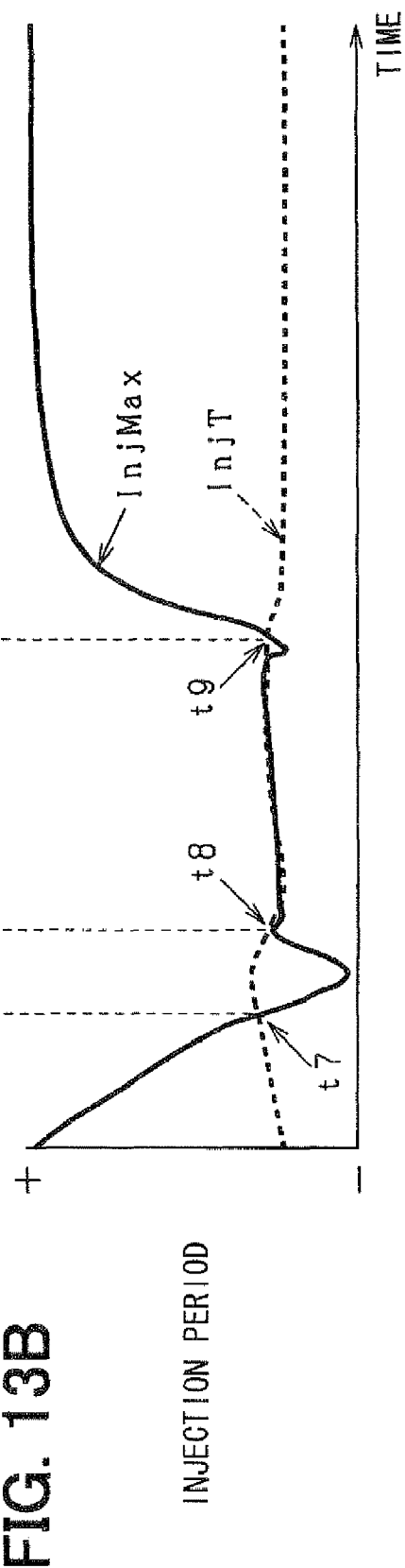

FUEL ESTIMATING DEVICE

CROSS-REFERENCE TO RELATED APPLICATION

This application is based on Japanese Patent Application No. 2007-156571 filed on Jun. 13, 2007, the disclosure of which is incorporated herein by reference.

FIELD OF THE INVENTION

The present invention relates to a fuel estimating device to estimate whether alternate fuel (for example alcohol) is blended with a regular fuel (for example gasoline).

BACKGROUND OF THE INVENTION

Alcohol fuel is known as an alternate fuel for gasoline and light diesel oil (hereunder referred to as a regular fuel). An operation of an internal combustion engine must be changed in response to whether a regular fuel or a fuel mixture of the regular fuel and the alternate fuel is injected from a fuel injector.

If it is attempted to obtain an excess air ratio equal to gasoline with respect to an alcohol fuel, a larger amount of fuel injection than gasoline (for example about 1.6 times) is required. That is, with regard to the output torque of an internal combustion engine obtained by fuel injection for a certain period of time, the output torque obtained in the case of the injection of a fuel mixture is smaller than that in the case of the injection of a fuel containing gasoline by 100%. Consequently, the injection time of a fuel mixture must be longer than that of 100% gasoline.

As stated above, in order to control an internal combustion engine to a desired operational state, information on whether the injected fuel is a regular fuel or a fuel mixture (hereunder referred to as fuel feature information) is required. JP-2007-120414A shows an internal combustion engine is controlled by installing an alcohol concentration sensor to detect an alcohol concentration in a fuel tank. However, an alcohol concentration sensor is expensive and the cost largely increases accordingly.

SUMMARY OF THE INVENTION

The present invention has been made in order to solve the aforementioned problems and an object of the present invention is to provide a fuel estimating device that can obtain information on whether an alternate fuel is blended with a regular fuel without using of an alcohol concentration sensor.

According to an aspect of the present invention, a fuel estimating device: is provided with a requested injection time computation means to compute a requested injection time that is a time necessary for a fuel injector to inject a fuel per one combustion cycle in response to the variables of an accelerator manipulated by a driver, an injectable time computation means to compute an injectable time per one combustion cycle on the basis of a rotation speed of the output shaft of an internal combustion engine, and a determination means to judge whether or not the requested injection time is larger than the injectable time; and estimates that a fuel mixture other than a regular fuel that is assumed to be not determined positively by the determination means is blended with a fuel in a fuel tank when the determination means positively judges that the requested injection time is larger than the injectable time.

In the case of a fuel mixture produced by blending an alternate fuel with a regular fuel, the injection time of the fuel must be longer than the case of a 100% regular fuel. As a result, the phenomenon that a requested injection time per one combustion cycle exceeds the time that allows injection (injectable time) per one combustion cycle (720° CA) may occur. In particular, in an operation region wherein the rotation speed of the output shaft of an internal combustion engine (engine speed) is high, the required time per one combustion cycle is short, thus the injectable time is also short, and the state where a requested injection time exceeds an injectable time is likely to occur undesirably.

In view of the above situation, by the present invention, since it is estimated that a fuel mixture is blended with a fuel in a fuel tank when a requested injection time is positively determined to be larger than an injectable time, it is possible to obtain information (fuel feature information) on whether the injected fuel is a regular fuel or a fuel mixture without the use of such a sensor as an alcohol concentration sensor.

In recent years, the mechanism of driving an intake valve with an electromagnetic actuator in place of the driving with an intake cam has been developed and in this case it is possible to regulate an intake air flow rate by controlling the movement of the intake valve. An "intake air flow rate control valve" according to the present invention: is not limited to a throttle valve that is attached to an intake pipe and adjusts an intake air flow rate; but includes such an intake valve driven with an electromagnetic actuator as described above.

BRIEF DESCRIPTION OF THE DRAWINGS

Other objects, features and advantages of the present invention will become more apparent from the following detailed description made with reference to the accompanying drawings, in which like parts are designated by like reference numbers.

FIG. 10A to 10C are timing charts showing for showing the procedure shown in FIGS. 8 and 9.

FIGS. 13A and 13B are timing charts for showing the procedure shown in FIGS. 11 and 12.

DETAILED DESCRIPTION OF EMBODIMENTS

Embodiments according to the present invention are hereunder explained in reference to drawings.

First Embodiment

Figure 1:
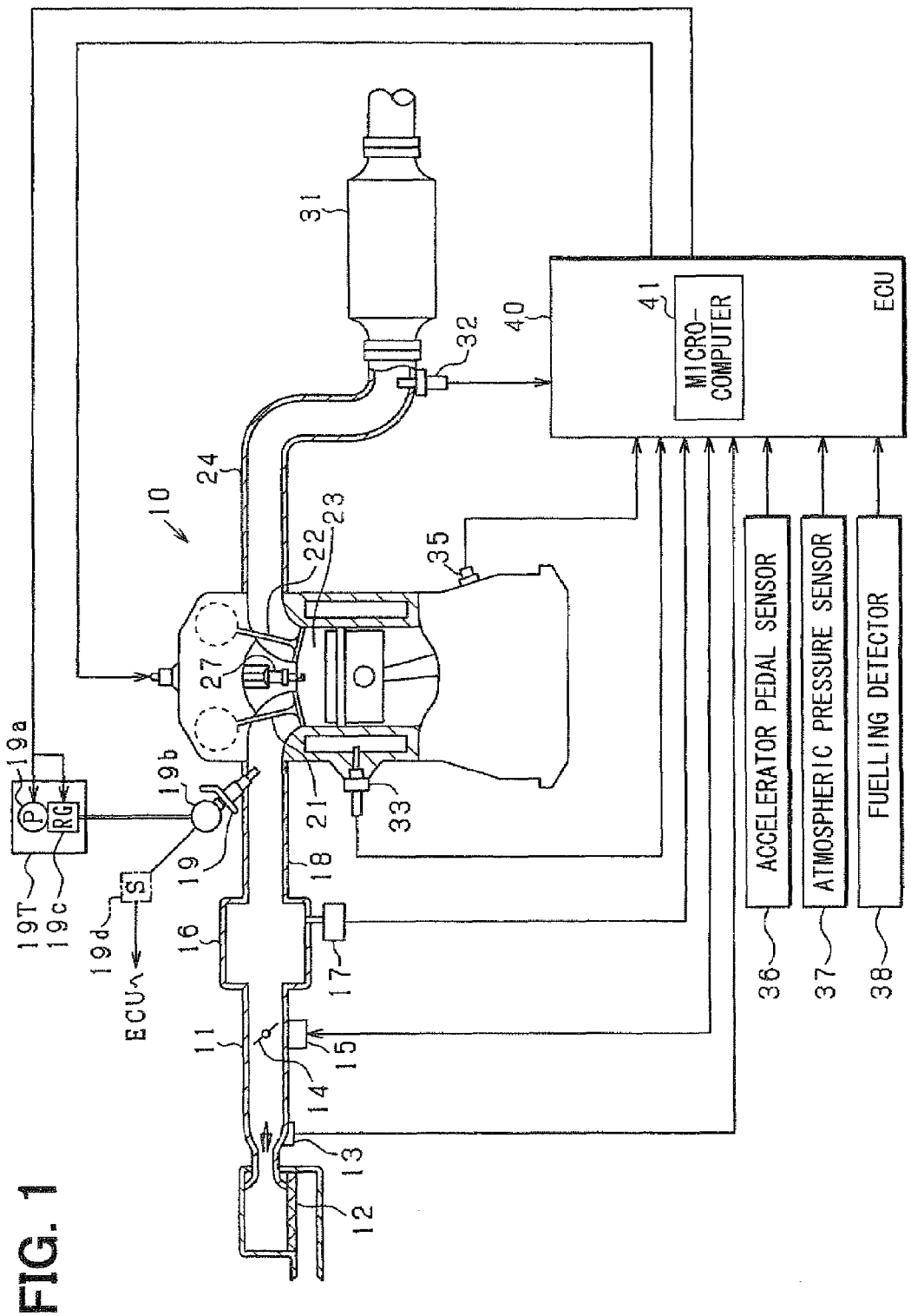
FIG. 1 is a general configuration view showing an internal combustion engine control system according to a first embodiment.

In the present embodiment, an internal combustion engine control system is configured with a vehicle-mounted multiple cylinder gasoline engine. In the control system, the control of a fuel injection quantity and the control of ignition timing are executed mainly with an electronic control unit (hereunder referred to as an ECU) 40. Referring to FIG. 1, a general configuration of the internal combustion engine control system will be explained.

In an engine 10, an air cleaner 12 is disposed on the uppermost stream side of an intake pipe 11 and an air flow meter 13 to detect an intake air flow rate is disposed on the downstream side of the air cleaner 12. On the downstream side of the air flow meter 13, a throttle valve 14 (an intake air flow rate control valve) of which opening degree is adjusted by a throttle actuator 15 comprising a DC motor is disposed. The opening degree of the throttle valve 14 (a throttle opening degree) is detected by a throttle position sensor incorporated in the throttle actuator 15. Although the structure is configured so that a throttle valve 14 may be disposed for a plurality of cylinders in the present embodiment, it is also possible to configure the structure so that a throttle valve 14 may be disposed for each cylinder and in this case the intake air flow rate in each combustion chamber 23 may be independently controlled.

A surge tank 16 is disposed on the downstream side of the throttle valve 14 and an intake air pressure sensor 17 to detect an intake pipe pressure is attached to the surge tank 16. Further, an intake manifold 18 to introduce air into each cylinder of the engine 10 is connected to the surge tank 16 and a fuel injector 19 of an electromagnetically driven type to inject a fuel is disposed in the vicinity of the intake port of each cylinder in the intake manifold 18.

An electrically driven fuel pump 19Sa is disposed in a fuel feed channel extending from a fuel tank 19T to the fuel injector 19. The fuel pump 19a according to the present embodiment is of an in-tank type and is disposed in the fuel tank 19T. The fuel in the fuel tank 19T is supplied to a delivery pipe 19b by the fuel pump 19a and distributed from the delivery pipe 19b to each fuel injector 19.

An intake valve 21 and an exhaust valve 22 are disposed at the intake port and the exhaust port of the engine 10 respectively. A mixed gas of air and the fuel is introduced into a combustion chamber 23 through the intake valve 21, and an exhaust gas after combusted is discharged to an exhaust pipe 24 (an exhaust channel) through the exhaust valve 22.

An ignition plug 27 is attached to the cylinder head of each cylinder in the engine 10 and high voltage is applied to the ignition plug 27 at a desired ignition time through an ignition device (not shown) comprising ignition coils and others. By applying high voltage, spark discharge occurs between the opposing electrodes of each ignition plug 27 and the mixed gas introduced into the combustion chamber 23 is ignited and combusted.

A catalyst 31 such as a three-way catalyst to purify CO, HC, NOx and others in an exhaust gas is attached to the exhaust pipe 24. On the upstream side of the catalyst 31, an A/F sensor 32 to detect an air-fuel ratio (an oxygen concentration) of the exhaust gas is disposed.

Further, a coolant temperature sensor 33 to detect a coolant temperature and a crank angle sensor 35 to output a rectangular-shaped crank angle signal for every prescribed crank angle (for example at 30° CA cycle) of an engine are attached to the cylinder block of the engine 10. In addition, in the present control system, an accelerator pedal sensor 36 to detect an accelerator position manipulated by a driver and an atmospheric pressure sensor 37 to detect the atmospheric pressure are disposed.

The ECU 40 has a microcomputer 41 comprising CPU, ROM, RAM, EEPROM, and others as the main component. The ECU 40 executes various kinds of control programs stored in the ROM; and thereby controls the engine 10 variously in accordance with an occasional engine operation state. That is, various detection signals are input to the microcomputer 41 of the ECU 40 from the aforementioned various kinds of the sensors. Then the microcomputer 41 computes a fuel injection quantity, an ignition timing, a throttle opening degree, and others on the basis of the various kinds of the detection signals input. The ECU 40 controls the fuel injector 19, the ignition device, and the throttle actuator 15. More specifically in the control of a fuel injection quantity, the microcomputer 41 sets a target air-fuel ratio on the basis of an engine operation state and executes air-fuel ratio feedback control so that the actual air-fuel ratio detected by the A/F sensor 32 may coincide with the target air-fuel ratio.

The ECU 40 controls the operation of the fuel pump 19a. The duty ratio of s the on/off control of the fuel pump 19a is fixed to a predetermined value in the ordinary case where load-up operation is not adopted. Then, when the discharge pressure of the fuel discharged from the fuel pump 19a exceeds a threshold value, the pressure regulator 19c is activated and thereby the fuel is brought back into the fuel tank 19T. Consequently, the pressure of the fuel in the delivery pipe 19b is maintained at a prescribed value within the range not exceeding the threshold value.

The fuel pump 19a is of an in-tank type. Since the pressure regulator 19c is placed in the fuel tank 19T, the fuel of which discharge pressure exceeds the threshold value is never supplied to the delivery pipe 19b. That is, a returnless type is adopted.

In a case that the fuel mixture of alcohol and gasoline is injected through the fuel injector 19, a more fuel injection quantity is required than the case of gasoline. In the present embodiment, it is attempted to well conform to the change from the state of 100% gasoline to a state of blending an alcohol fuel.

Figure 2:
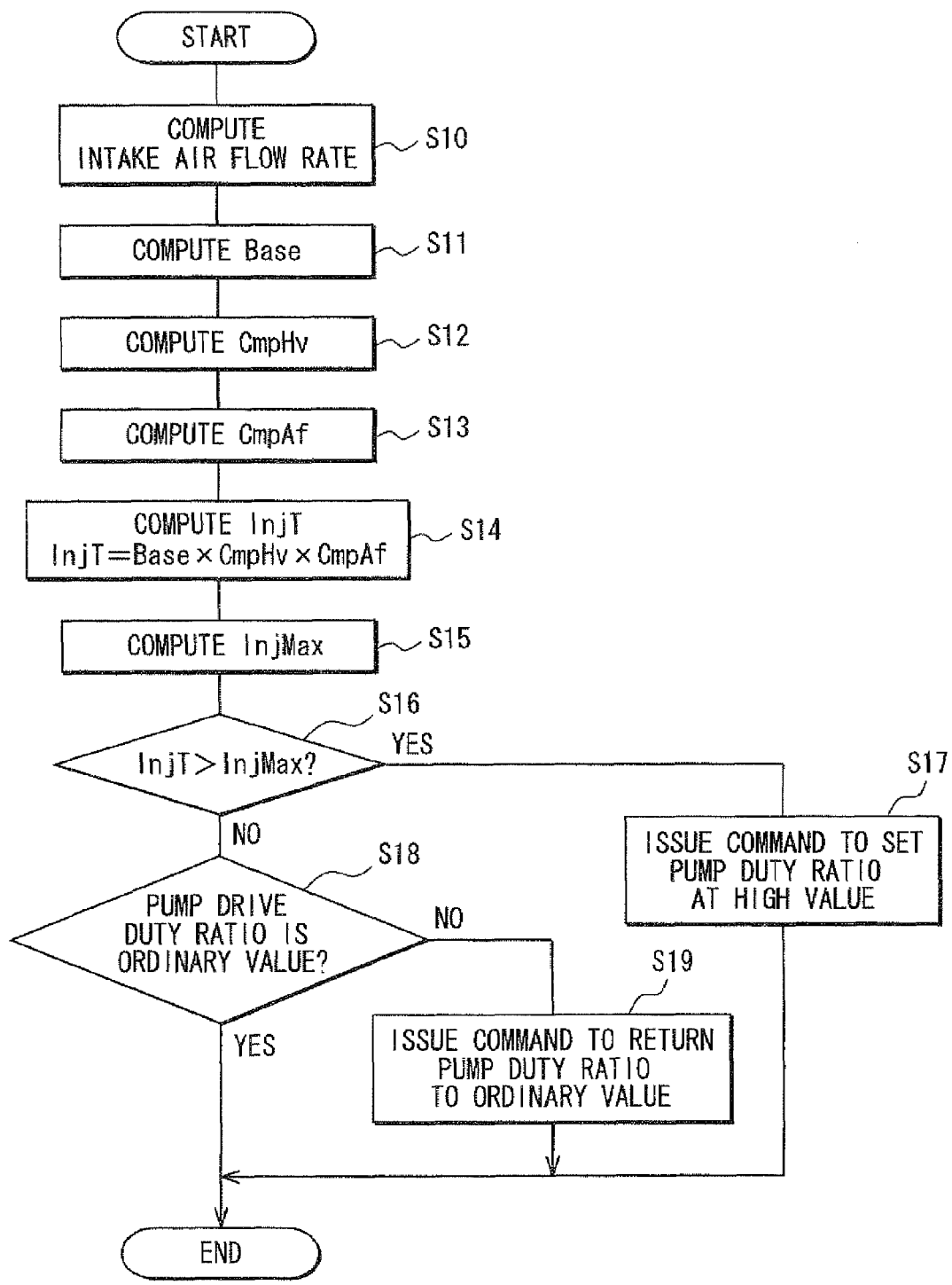
FIG. 2 is a flowchart showing the control procedure by an ECU according to the first embodiment.
Figure 3:
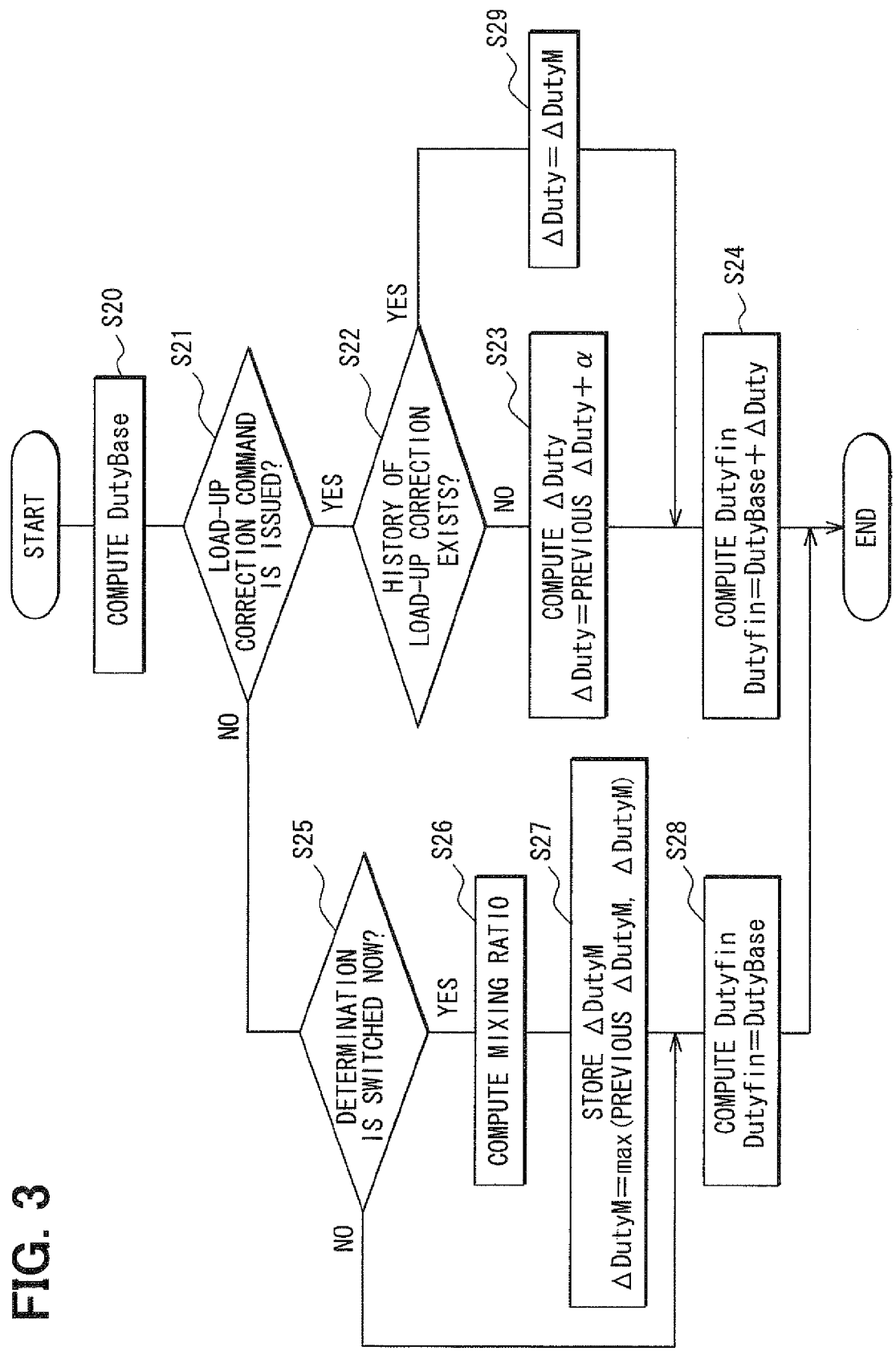
FIG. 3 is a flowchart showing a pump control routine according to the first embodiment.

The control procedure of the fuel pump 19a with the ECU 40 is hereunder explained in reference to the flowcharts shown in FIGS. 2 and 3. The procedure is repeated on a prescribed cycle (for example 10 msec cycle).

At Step S10 in FIG. 2, an actual intake airflow rate is computed on the basis of a value measured by the air flow meter 13. Successively, at Step S11, a basic fuel time Base per each cylinder is computed on the basis of the computed intake air flow rate. The basic fuel time Base is computed so that its value may increase as the intake air flow rate increases.

At Step S12, a fuel increment CmpHv is computed on the basis of: an engine speed computed on the basis of signals outputted from the crank angle sensor 35; and an intake air pressure computed on the basis of a value measured by the intake air pressure sensor 17. The fuel increment CmpHv is computed so as to increase as the engine speed and the intake air pressure increase.

At Step S13, a fuel correction value CmpAf is computed on the basis of the deviation (an actual air-fuel ratio minus a target air-fuel ratio) between an actual air-fuel ratio computed on the basis of a value measured by the A/F sensor 32 and a target air-fuel ratio. The fuel correction value CmpAf is computed so as to be a larger value as the deviation increases and is a correction value used for bringing an actual air-fuel ratio close to a target air-fuel ratio.

At Step S14, a requested injection time InjT of a fuel injected per one cylinder is computed on the basis of the following computation formula;

InjT=Basic fuel time Base×Fuel increment CmpHv× Fuel correction value CmpAf

By opening the fuel injector 19 for a requested injection time InjT, the pressure in the delivery pipe 19b is maintained at a prescribed value and hence a fuel in the quantity responding to the requested injection time InjT is injected from the fuel injector 19. The basic fuel time Base is computed at Step S11 on premise that a fuel in the quantity responding to the requested injection time InjT is injected in one combustion cycle.

At Step S15, a maximum injectable time InjMax is computed on the basis of an engine speed. In the present embodiment, 700° CA in one combustion cycle of 720° CA is set as the maximum injectable crank angle and the time spent while a crank shaft rotates by 700° CA is the maximum injectable time InjMax.

At Step S16, whether or not the requested injection time InjT is larger than the injectable time InjMax is determined. If it is positively determined that InjT is larger than InjMax, the injection quantity is in an insufficient state and it is concerned that the actual air-fuel ratio deviates from the target air-fuel ratio toward the side of a lean air-fuel ratio. In order to avoid the concern, when the positive determination is made (YES at Step S16), the procedure proceeds to Step S17 and the fuel pump 19a is subjected to load-up operation so as to increase the fuel pressure in the delivery pipe 19b.

The duty ratio of on/off control of the fuel pump 19a is to be raised in order to increase the fuel pressure in the delivery pipe 19b. At Step S17, correction command is issued so as to set the pump drive duty ratio at a high value conforming to load-up operation. More specifically, a flag of load-up correction command is placed. Then, when such load-up correction command is issued, the duty ratio increases in the pump control routine shown in FIG. 3 as it will be described later.

At Step S16, when negative determination is made (NO at Step S16), the procedure proceeds to Step S18 in which it is determined whether the pump drive duty ratio is an ordinary value. When it is determined that the pump drive duty ratio is not an ordinary value (NO at Step S18), correction command is issued so as to bring the pump drive duty ratio back from the high value to the ordinary value at the succeeding Step S19. More specifically, a flag of ordinary value correction command is placed.

FIG. 3 is a flowchart showing the procedure of pump control to compute a control value output from the ECU 40 to the fuel pump 19a. At Step S20, the basic duty ratio DutyBase of the fuel pump 19a is computed. Successively at Step S21, whether or not the load-up correction command at Step S17 is issued is determined on the basis of the flag.

When it is determined that the load-up correction command is issued (YES at Step S21), whether or not the history of the load-up correction exists is determined at the succeeding Step S22. If it is determined that the history of the load-up correction does not exist (NO at Step S22), the duty ratio increment ΔDuty is computed on the is basis of the following computation formula at Step S23;

ΔDuty=Previous ΔDuty+α wherein the value of a is fixed to a predetermined value.

At Step S24, a final control value Dutyfin output from the ECU 40 to the fuel pump 19a is computed on the basis of the following computation formula;

Dutyfin=Basic duty ratio DutyBase+Increment Δduty

When it is determined that the load-up correction command is not issued (NO at Step S21), the procedure proceeds to Step S25 and whether or not the determination at Step S21 is now switched from positive determination to negative determination is determined. If it is determined that the determination is now switched (YES at Step S25), the mixing ratio that is the ratio of gasoline to an alcohol fuel is computed with the graphs shown in FIGS. 4A and 4B at Step S26.

Figure 4A:
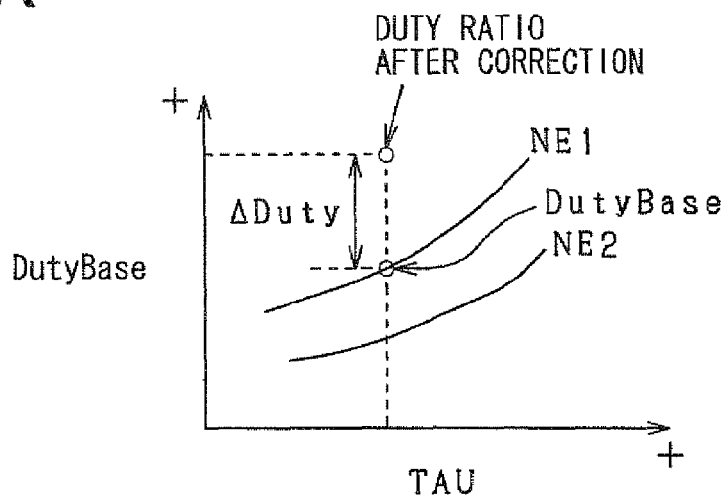
FIGS. 4A to 4C are graphs used in the computation of a mixing ratio.
Figure 4B:
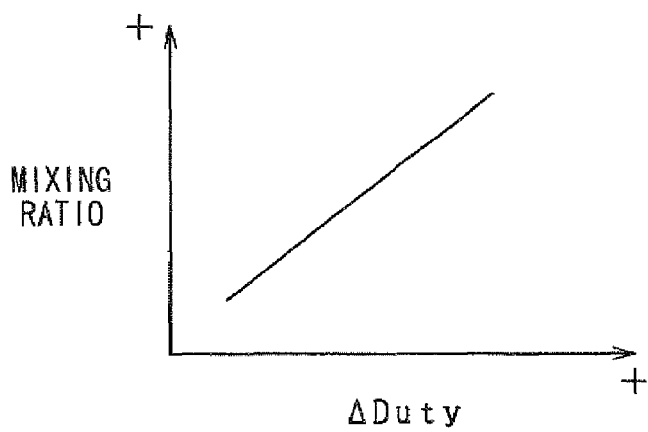

The solid lines in FIG. 4A show the relationship between a fuel injection quantity TAU actually injected from the fuel injector 19 and a basic duty ratio DutyBase. Then the relationship between the injection quantity TAU and the basic duty ratio DutyBase is graphically shown in response to an engine speed. Then at Step S26 firstly, the deviation ΔDuty between a control value Dutyfin that is a duty ratio after correction and the basic duty ratio DutyBase is computed with the graph in FIG. 4A. Then a mixing ratio is computed on the basis of the deviation ΔDuty with the graph in FIG. 4B showing the relationship between the deviation ΔDuty and the mixing ratio.

Figure 4C:
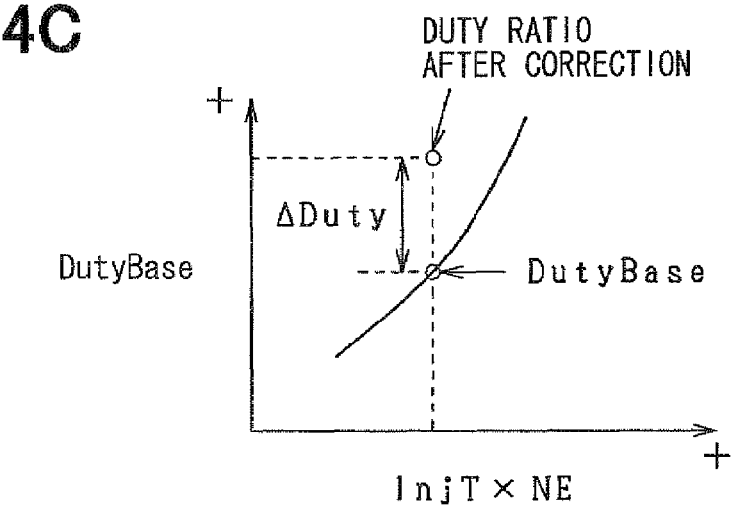

A mixing ratio may be computed with the graph shown in FIG. 4C in place of the graph shown in FIG. 4A. FIG. 4C is a graph showing the relationship between a value obtained by multiplying a requested injection time InjT by an engine speed NE and a basic duty ratio DutyBase. The deviation ΔDuty for use in FIG. 4B can be obtained with the graph in the same way as the case of FIG. 4A.

At Step S27, the deviation ΔDuty and the previous deviation ΔDuty are compared with each other and the larger value of them is stored in a backup RAM as a history deviation ΔDutyM. The history deviation ΔDutyM thus stored is erased when an ignition switch is turned off. Otherwise, the history deviation ΔDutyM may be set so as to be erased when a fuel is fed to the fuel tank 19T. Still otherwise, a history correction quantity ΔTHM may be stored and maintained without being erased.

Whether or not a fuel is supplied may be determined on the basis of signals output from a detector 38 to detect the opening and closing of a refueling cap (refer to FIG. 1) or signals output from a detector to detect the residual quantity of the fuel in the fuel tank. In other words, the memory of the history is maintained until the signals output from the detector (canceling signals) are obtained.

At Step S28, the final control value Dutyfin output from the ECU 40 to the fuel pump 19a is used as the basic duty ratio DutyBase. If it is determined that the determination is not switched now at Step S25 (NO in Step S25), the procedure proceeds to Step S28 without the computation of the mixing ratio at Step S26 and the process of adopting the control value Dutyfin as the basic duty ratio DutyBase is executed.

When the history is stored at Step S27, it is determined that the history of load-up correction exists at Step S22 and on this occasion the stored history deviation ΔDutyM is set as the increment ΔDuty at Step S29. That is, when the determination is once switched from the determination that load-up correction command exists to the determination that load-up correction command does not exist (YES at Step S25), the history deviation ΔDutyM at the time is computed (Step S26) and stored (Step S27). When the load-up correction command exists afterward (YES at Step S22), the basic duty ratio DutyBase is increased by the stored history deviation ΔDutyM without the computation of the increment ΔDuty (Step S24).

Figure 5A:
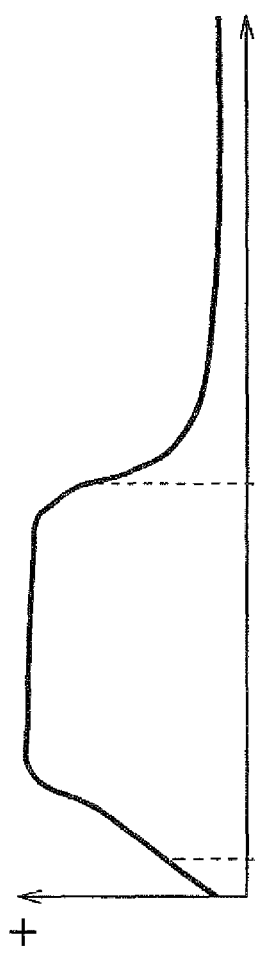
FIG. 5A to 5C are timing charts for showing the procedure shown in FIGS. 2 and 3.
Figure 5B:
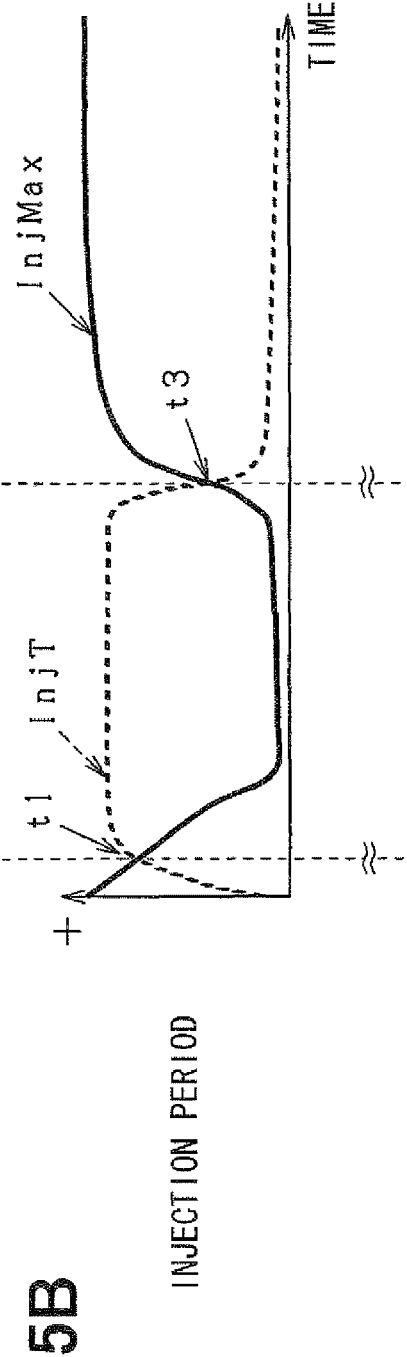
Figure 5C:
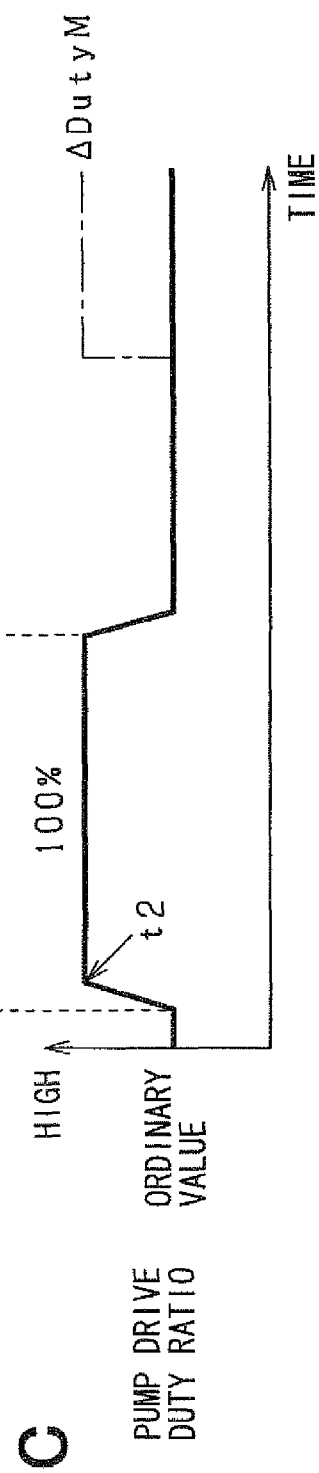

FIGS. 5A-5C show a case where the drive of the fuel pump 19a is controlled on the basis of the determination at Step S16. FIG. 5A shows the change of the engine speed NE computed on the basis of signals output from the crank angle sensor 35. In FIG. 5B, the solid line shows the change of the maximum injectable time InjMax and the dotted line shows the change of the requested injection time InjT per one cylinder when an alcohol fuel is not blended. FIG. 5C shows the change of the pump drive duty ratio responding to a control value Dutyfin.

As shown in FIGS. 5A-5C, the maximum injectable time InjMax lowers as the engine speed increases due to the increase of the accelerator stroke or the like, and increases as the engine speed decreases. Then, when the maximum injectable time InjMax lowers as the engine speed increases and the time t1 comes, the requested injection time InjT comes to be larger than the maximum injectable time InjMax because an alcohol fuel is blended with gasoline.

At the time of t1, the determination at Step S16 shifts from negative determination to positive determination. Then, as long as the state of the positive determination of the expression InjT>InjMax continues, the control value Dutyfin increases gradually every time by the value α in the processes at Step S23 and other steps and the pump drive duty ratio increases gradually from the ordinary value. Thereafter, the value is maintained after the time t2 when the pump drive duty ratio reaches 100%.

Thereafter, when the maximum injectable time InjMax increases as the engine speed lowers due to the decrease of the accelerator stroke and the time t3 comes, the requested injection time InjT comes to be smaller than the maximum injectable time InjMax. That is, the state where a fuel of the quantity corresponding to the requested injection time InjT can be injected is obtained. At the time of t3, the determination with the expression InjT>InjMax at Step S16 shifts from positive determination to negative determination. Then the pump drive duty ratio returns to the ordinary value from 100% in the process at Step S19.

Successively, when the requested injection time InjT exceeds the maximum injectable time InjMax again, as shown with the dashed-dotted line in FIG. 5C, the pump drive duty ratio increases again so as to take the value of the stored history deviation ΔDutyM.

The following excellent advantages are obtained in the present embodiment described above in detail.

(1) When the requested injection time InjT exceeds the maximum injectable time InjMax because an alcohol fuel is blended with gasoline, load-up operation is adopted. Consequently, since the fuel pressure in the delivery pipe 19b increases and the fuel quantity injected per unit time from the fuel injector 19 also increases, the fuel quantity injected during the injectable time increases even when the maximum injectable time InjMax is not changed. As a result, it is possible to avoid the undesirable cases where a fuel of a quantity that gives an optimum air-fuel ratio to a requested intake air flow rate (a fuel quantity corresponding to the requested injection time InjT) is not injected when the quantity of an alcohol fuel blended with gasoline increases. Further, it is suppressed that the air-fuel ratio deviates from the optimum value toward the side of a lean air-fuel ratio.

(2) In the case of lean burn combustion, because the combustion state is destabilized, it is concerned that HC and $O_2$ flowing in the catalyst 31 increase and are combusted in the vicinity of the catalyst 31. As the result, the temperature of the catalyst 31 rises and the catalyst 31 deteriorates. In contrast, in the present embodiment, the air-fuel ratio is prevented from deviating toward the side of the lean air-fuel ratio as stated above and hence the above concern can be avoided.

(3) During the time period when the requested injection time InjT exceeds the maximum injectable time InjMax (t1 to t3), the load-up operation of the fuel pump 19a continues and hence the air-fuel ratio can come close to the target air-fuel ratio (for example a stoichiometric air-fuel ratio).

(4) The mixing ratio that is the ratio of gasoline to an alcohol fuel is computed on the basis of the history deviation ΔDutyM that is the maximum value of the increment ΔDuty (the load-up quantity) of the duty ratio of the fuel pump 19a. Consequently, it is possible to compute (estimate) the mixing ratio of the gasoline to the alcohol fuel without the need of an alcohol concentration sensor to detect the concentration of an alcohol fuel. The mixing ratio can be estimated as a specific value with graphs when the duty ratio is less than 100%. When the duty ratio exceeds 100%, the alcohol concentration may be estimated to be a concentration not less than the alcohol concentration when the duty ratio is equal to 100%.

Second Embodiment

In the aforementioned first embodiment, the load-up operation is executed by increasing the drive duty ratio of the fuel pump 19a. In the second embodiment, feedback control is adopted so that the fuel pressure in the delivery pipe 19b (feed pressure) may take a target pressure (a target fuel pressure) and the load-up operation is executed by increasing the target fuel pressure.

Figure 6:
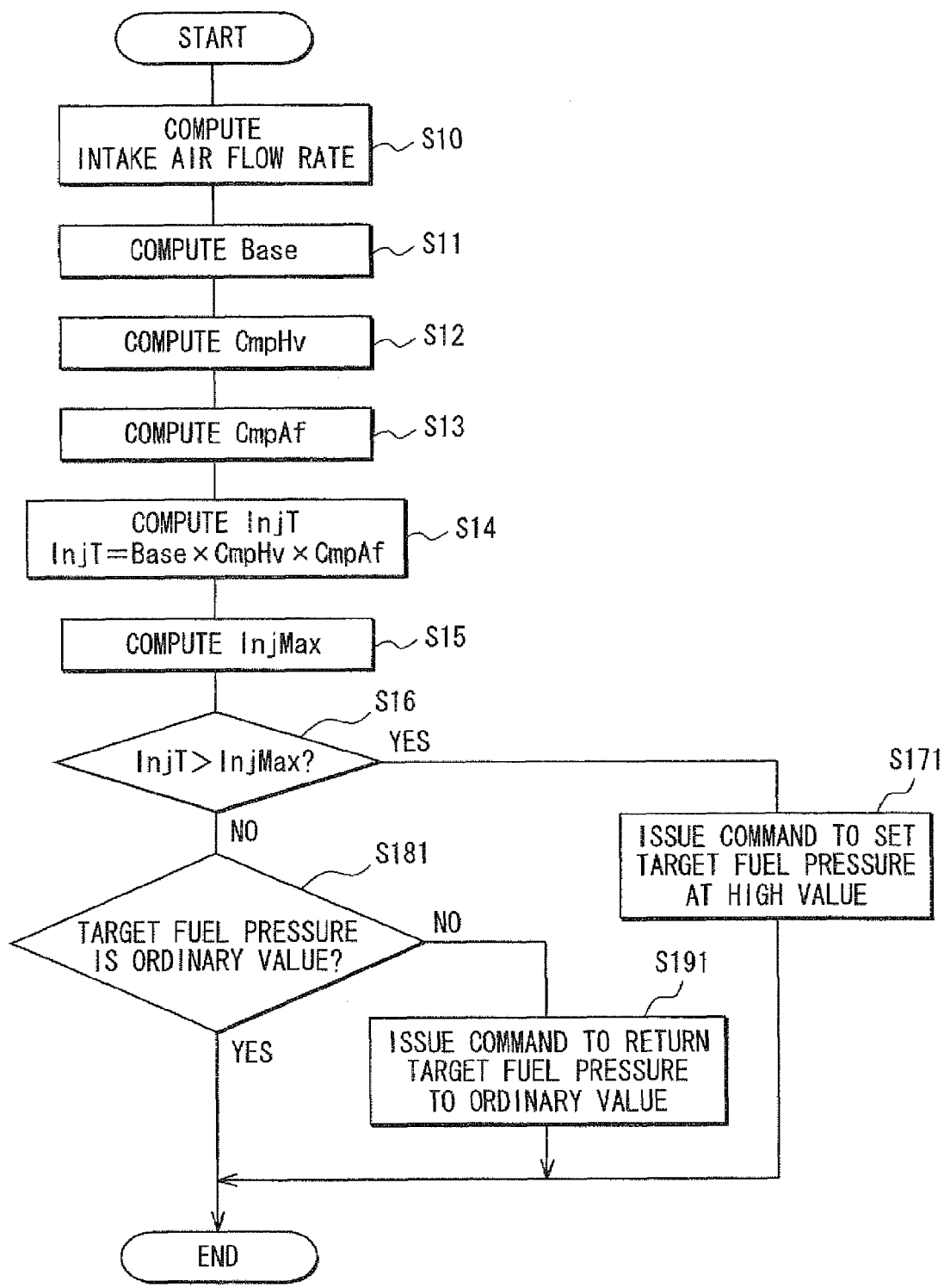
FIG. 6 is a flowchart showing a control procedure by the ECU according to a second embodiment.
Figure 7:
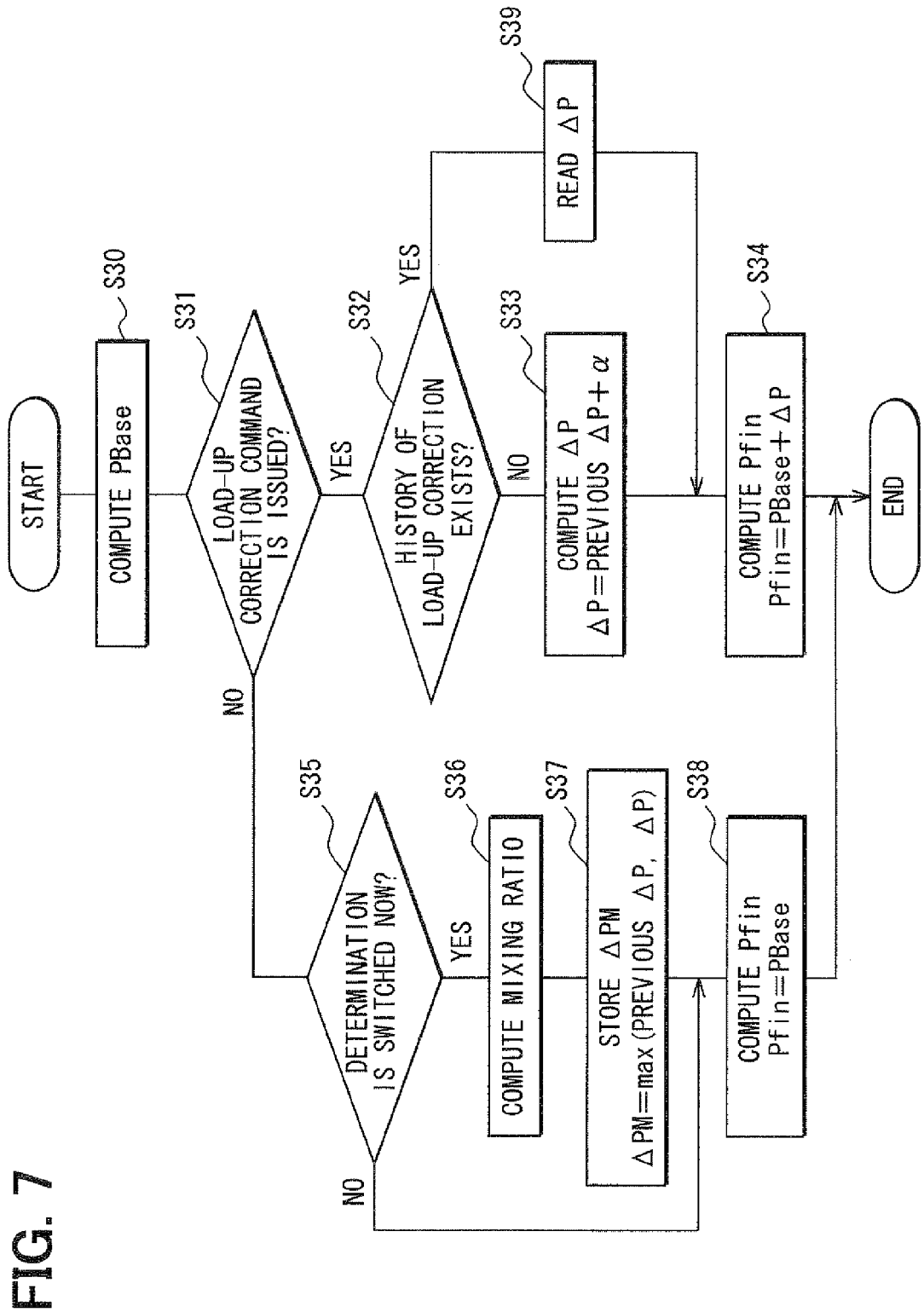
FIG. 7 is a flowchart showing a pump control routine according to the second embodiment.

FIGS. 6 and 7 are flowcharts showing the control procedure of the fuel pump 19a according to the present embodiment. The same codes are named to the steps of the same processes as shown in FIGS. 2 and 3 and the same explanations are used. Further, in the present embodiment, a fuel pressure sensor 19d to detect the fuel pressure in the delivery pipe 19b (refer to the dashed-dotted line in FIG. 1) is disposed. The other parts of the configuration are the same as the first embodiment. The signals detected by the fuel pressure sensor 19d are input into the ECU 40.

Then as shown in FIG. 6, when it is determined that the requested injection time InjT exceeds the injectable time InjMax at Step S16, the procedure proceeds to Step S171 and correction command is issued so as to set the target fuel pressure at a high value conforming to load-up operation. When the answer is No in Step S16, the procedure proceeds to Step S181 in which it is determined whether the target fuel pressure is the ordinary value. When it is determined that the target fuel pressure is not the ordinary value (NO at Step S181), correction command is issued so that the target fuel pressure may return to the ordinary value from the high value at the succeeding Step S191.

In the processes shown in FIG. 7, at Step S30, the basic target fuel pressure PBase of the fuel pump 19a is computed. Successively at Step S31, it is determined whether or not the correction command of load-up at Step S171 is issued on the basis of a flag.

When it is determined that the load-up correction command exists (YES at Step S31), at the succeeding Step S32, it is determined whether the history of the load-up correction exists. When it is determined that the load-up correction history does not exist (NO at Step S32), at Step S33, the increment ΔP of the target fuel pressure is computed on the basis of the following computation formula;

$$\Delta P = \text{Previous } \Delta P + \beta$$

The value β in the computation formula is fixed to a predetermined value.

At Step S34, the final target fuel pressure Pfin is computed on the basis of the following computation formula;

$$P\text{fin} = \text{Basic target fuel pressure } P\text{Base} + \text{Increment } \Delta P.$$

The drive of the fuel pump 19a is controlled so that the fuel pressure may take the final target fuel pressure Pfin.

When it is determined that load-up correction command does not exist (NO at Step S31), the procedure proceeds to Step S35 in which it is determined whether the determination at Step S31 is now switched from positive determination to negative determination. When it is determined that the determination is now switched (YES at Step S35), the mixing ratio that is the ratio of gasoline to an alcohol fuel is computed with a map at Step S36. The map used here is prepared by storing beforehand the relationship between the increment ΔP of the target fuel pressure and the mixing ratio. The mixing ratio is computed so that the mixing ratio of the alcohol fuel may increase as the increment ΔP increases.

At Step S37, the increment ΔP and the previous increment ΔP are compared with each other and the larger value of them is stored in a backup RAM as a history increment ΔPM. Here, the history increment ΔPM thus stored is erased when an ignition switch is turned off. Otherwise, the history increment ΔPM may be set so as to be erased when a fuel is fed to the fuel tank 19T. Still otherwise, a history correction quantity ΔTHM may be stored and maintained without being erased.

Whether or not a fuel is supplied may be determined on the basis of signals output from a detector 38 to detect the opening and closing of a refueling cap (refer to FIG. 1) or signals output from a detector to detect the residual quantity of the fuel in the fuel tank.

At Step S38, the final target fuel pressure Pfin is used as the basic target fuel pressure PBase. If it is determined that the determination is not switched now at Step S35 (NO at Step S35), the procedure proceeds to Step S38 without the computation of the mixing ratio at Step S36 and the process of adopting the final target fuel pressure Pfin as the basic target fuel pressure PBase is executed.

When the history is stored at Step S37, it is determined that the history of load-up correction exists at Step S32 and on this occasion the stored history increment ΔPM is set as the increment ΔP at Step S39. That is, when the determination is once switched from the determination that load-up correction command exists to the determination that load-up correction command does not exist (YES at Step S35), the history increment ΔPM at the time is computed (Step S36) and stored (Step S37). When the load-up correction command exists afterward (YES at Step S32), the basic target fuel pressure PBase is increased by the value of the stored history deviation ΔPM without the computation of the increment ΔP (Step S34).

Successively an embodiment by the processes shown in FIGS. 6 and 7 is explained. The present embodiment, when compared with the embodiment shown in FIGS. 2 and 3, can be regarded as the same embodiment as shown in FIGS. 5A and 5B if the duty ratio in FIG. 5C is interpreted as the target fuel pressure P. Also in the present embodiment, the fuel pressure in the delivery pipe 19b does not increase even when the target fuel pressure Pfin further increases at the time t2 when the final target fuel pressure Pfin increases and the duty ratio reaches 100%.

The following effects are obtained also in the present embodiment described above in detail in the same way as the aforementioned first embodiment.

(1) The mixing ratio that is the ratio of gasoline to an alcohol fuel is computed on the basis of the history increment ΔPM that is the maximum value of the increment ΔP (the load-up quantity) of the target fuel pressure. Consequently, it is possible to compute (estimate) the mixing ratio of the gasoline to the alcohol fuel without an alcohol concentration sensor to detect the concentration of an alcohol fuel.

(2) When the requested injection time InjT exceeds the maximum injectable time InjMax, the target fuel pressure Pfin in the fuel pump 19a is increased and thereby load-up operation is adopted. Consequently, the fuel pressure in the delivery pipe 19b increases. As a result, the fuel quantity injected per unit time from the fuel injector 19 also increases and hence the fuel quantity injected during the injectable time increases even when the maximum injectable time InjMax is not changed. It is possible to avoid the undesirable cases where a fuel of a quantity that gives an optimum air-fuel ratio to a requested intake air flow rate is not injected when the quantity of an alcohol fuel blended with gasoline increases. Further, it is suppressed that the air-fuel ratio deviates from the optimum value toward the side of a lean air-fuel ratio.

(3) In the case of lean burn combustion, because the combustion state is destabilized, it is concerned that HC and $O_2$ flowing in the catalyst 31 increase and are combusted in the vicinity of the catalyst 31. As the result, the temperature of the catalyst 31 rises and the catalyst 31 deteriorates. In contrast, in the present embodiment, the air-fuel ratio is prevented from deviating toward the side of the lean air-fuel ratio as stated above and hence the above concern can be avoided.

(4) During the time period when the requested injection time InjT exceeds the maximum injectable time InjMax (t1 to t3), the load-up operation of the fuel pump 19a continues and hence the air-fuel ratio can come close to the target air-fuel ratio (for example the stoichiometric air-fuel ratio).

Third Embodiment

In the present embodiment, when the requested injection time InjT exceeds the maximum injectable time InjMax, the actual intake air flow rate is reduced by forcibly lowering the actual throttle opening degree to a level lower than the throttle opening degree corresponding to an accelerator position. Consequently, the requested injection time InjT reduces and thereby the determination with the expression InjT>InjMax at Step S16 is prevented from being positive determination.

Figure 8:
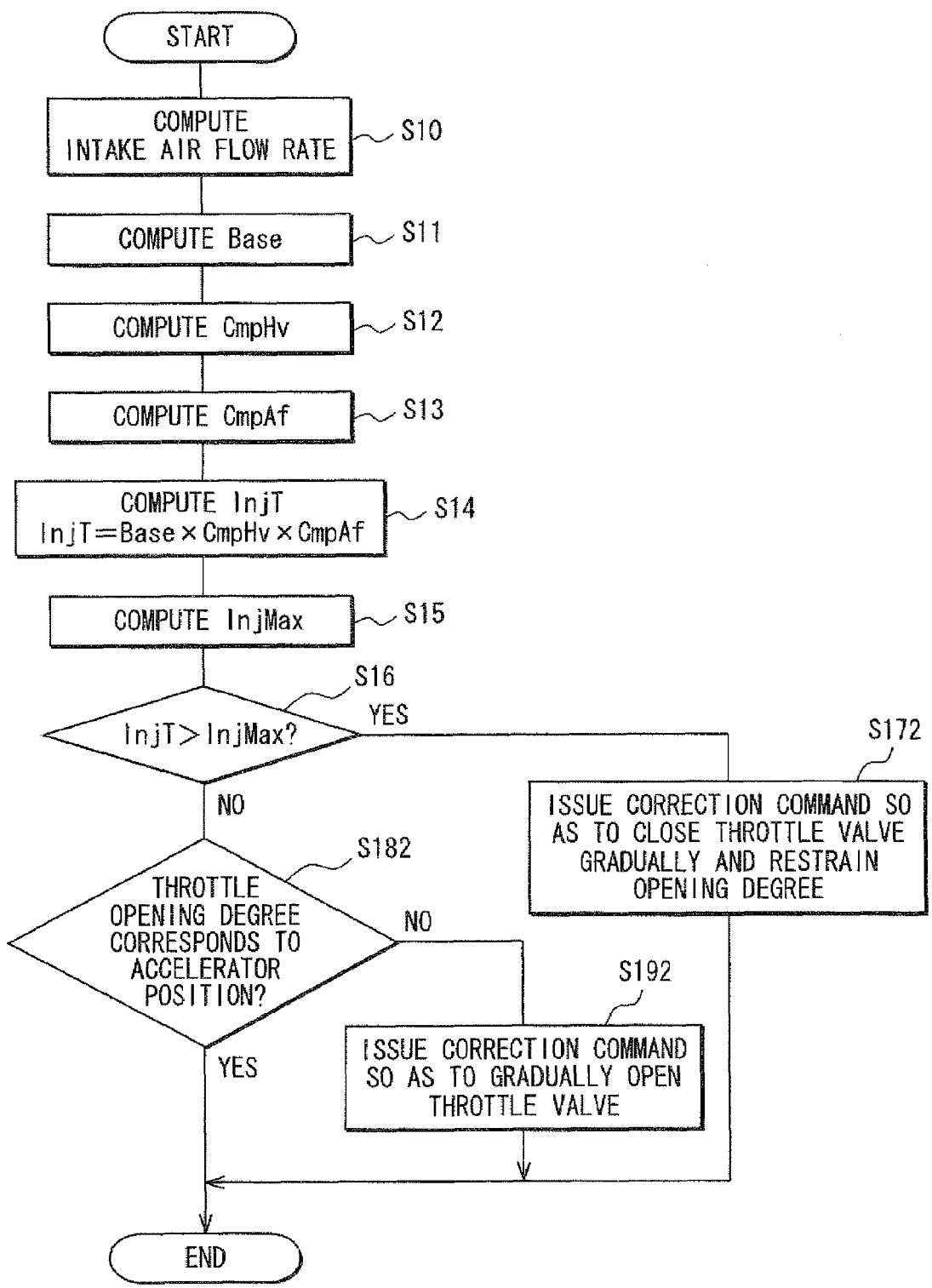
FIG. 8 is a flowchart showing a control procedure by the ECU according to a third embodiment.
Figure 9:
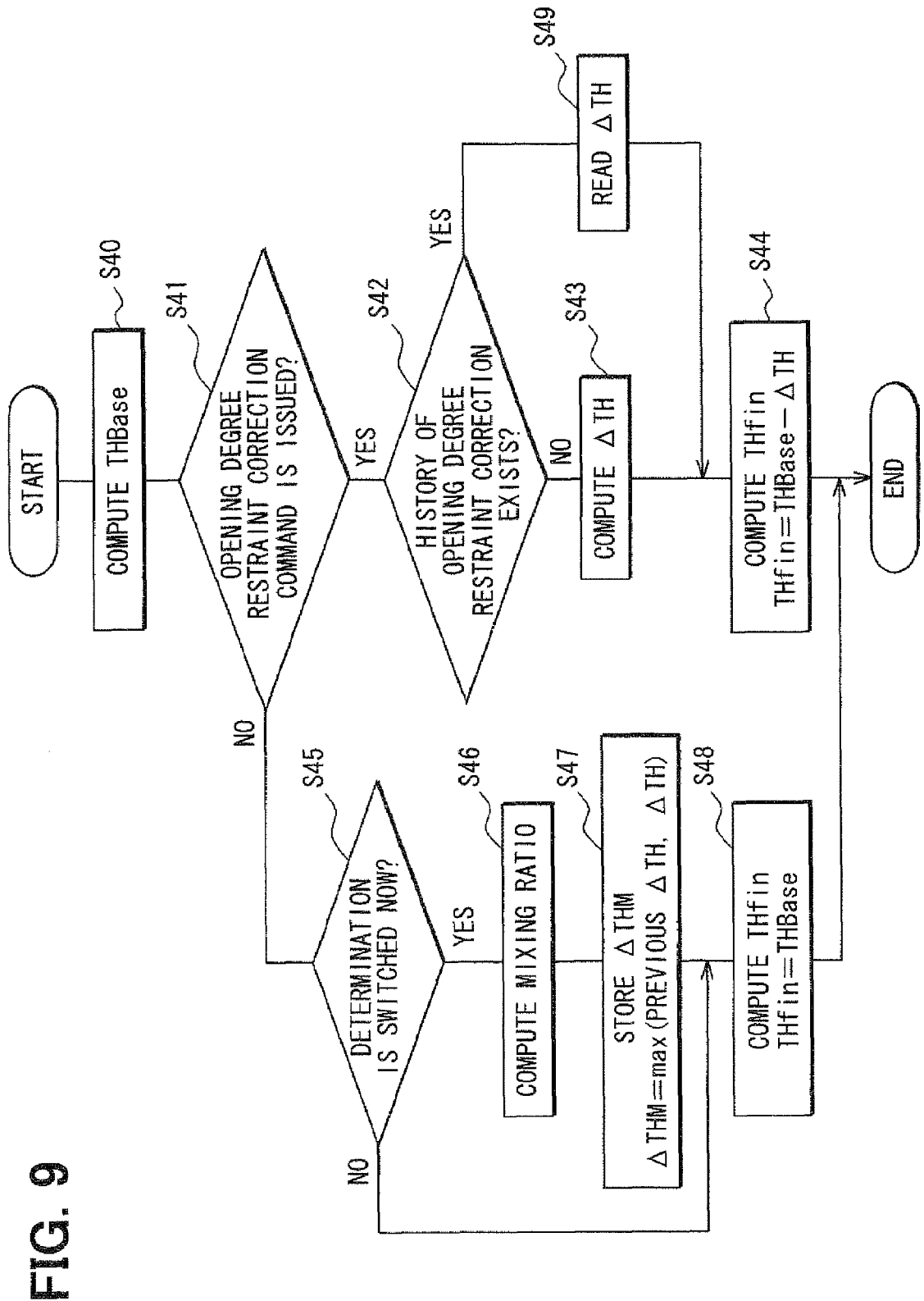
FIG. 9 is a flowchart showing a throttle control routine according to the third embodiment.

More specifically, FIGS. 8 and 9 are flowcharts showing the control procedure of the throttle actuator 15 with the ECU 40 according to the present embodiment and the same codes are named to the steps of the same processes as shown in FIGS. 2 and 3 and the same explanations are used. Further, the configuration of the present embodiment is the same as the first embodiment.

As shown in FIG. 8, when it is determined that the requested injection time InjT exceeds the injectable time InjMax at Step S16, the procedure proceeds to Step S172 and the above concern is attempted to be avoided by forcibly decreasing the throttle opening degree and reducing the actual intake air flow rate. That is, at Step S172, correction command is issued so as to close the throttle valve gradually and restrain the opening degree. More specifically, the flag of opening degree restraint correction command is placed. Then, when such opening degree restraint correction command is issued, the throttle opening degree lowers at the throttle control routine in FIG. 9 that will be described later.

When the determination is negative at Step S16 (NO at Step S16), the procedure proceeds to Step S182 in which it is determined whether the throttle opening degree corresponds to an accelerator position (a requested intake air flow rate). When it is determined that the throttle opening degree does not correspond to a requested intake air flow rate (NO at Step S182), at the succeeding Step S192, correction command is issued so as to gradually open the throttle valve 14 and the position returns from the restraint position to the position corresponding to the requested intake air flow rate. More specifically, the flag of requested opening degree return correction command is placed.

FIG. 9 is a flowchart showing the procedure of throttle opening degree control for computing a control value output from the ECU 40 to the throttle actuator 15. At Step S40, the basic requested opening degree THBase of the throttle valve 14 is computed. More specifically, the basic requested opening degree THBase of the throttle valve 14 is computed on the basis of a requested intake air flow rate responding to a position of the accelerator manipulated by a driver. Successively at Step S41, it is determined whether the opening degree restraint correction command is issued at Step S172 on the basis of the flag.

When it is determined that the opening degree restraint correction command exists (YES at Step S41), whether or not the history of opening degree restraint correction exists is determined at the succeeding Step S42. When it is determined that the opening degree restraint correction history does not exist (NO at Step S42), at Step S43, the correction quantity $\Delta TH$ as the decrement of the throttle opening degree caused by the opening degree restraint is computed on the basis of the following computation formula;

$$\Delta TH = \text{Previous } \Delta TH + \alpha$$

wherein the value $\alpha$ in the computation formula is fixed to a predetermined value.

At Step S44, the final control value THfin output from the ECU 40 to the throttle actuator 15 is computed on the basis of the following computation formula;

$$TH\text{fin Basic requested opening degree } TH\text{Base} + \text{Correction quantity } \Delta TH.$$

When it is determined that the opening degree restraint correction command does not exist (NO at Step S41), the procedure proceeds to Step S45 and whether or not the determination at Step S41 is now switched from positive determination to negative determination is determined. When it is determined that the determination is now switched (YES at Step S45), the mixing ratio that is the ratio of gasoline to an alcohol fuel is computed at Step S46. More specifically, firstly the deviation between the control value THfin as the opening degree after correction and the basic requested opening degree THBase corresponding to an accelerator position is computed as the opening degree correction quantity $\Delta TH$. Then a graph showing the relationship between the correction quantity $\Delta TH$ and the mixing ratio is stored beforehand and the mixing ratio is computed with the graph on the basis of the correction quantity $\Delta TH$.

At Step S47, the correction quantity $\Delta TH$ and the previous correction quantity $\Delta TH$ are compared with each other and the larger value of them is stored in a backup RAM as a history correction quantity $\Delta THM$. The history correction quantity $\Delta THM$ thus stored is erased when an ignition switch is turned off. Otherwise, the history correction quantity $\Delta THM$ may be set so as to be erased when a fuel is fed to the fuel tank 19T. Still otherwise, the history correction quantity $\Delta THM$ may be stored and maintained without being erased.

It may be determined whether a fuel is supplied on the basis of signals output from the detector 38 to detect the opening and closing of a refueling cap or signals output from a detector to detect the residual quantity of the fuel in the fuel tank. In other words, the memory of the history is maintained until the signals output from the detector (canceling signals) are obtained.

At Step S48, the final control value THfin output from the ECU 40 to the is throttle actuator 15 is used as the basic requested opening degree THBase. If it is determined that the determination is not switched now at Step S45 (NO in Step S45), the procedure proceeds to Step S48 without the computation of the mixing ratio at Step S46 and the process of adopting the control value THfin as the basic requested opening degree THBase is executed.

When the history is stored at Step S47, it is determined that the history of opening degree restraint correction exists at Step S42 and on this occasion the stored history correction quantity $\Delta THM$ is set as the correction quantity $\Delta TH$ at Step S49. That is, when the determination is once switched from the determination that opening degree restraint correction command exists to the determination that opening degree restraint correction command does not exist (YES at Step S45), the history correction quantity $\Delta THM$ at the time is computed (Step S46) and stored (Step S47). When the opening degree restraint correction command exists afterward (YES at Step S42), the basic requested opening degree THBase is decreased by the stored history correction quantity $\Delta THM$ without the computation of the correction quantity $\Delta TH$ (Step S44).

FIGS. 10A-10C shows an embodiment in which the drive of the fuel pump 19a is controlled on the basis of the determination at Step S16. FIG. 10A shows the change of the engine speed NE computed on the basis of signals output from the crank angle sensor 35. In FIG. 10B, the solid line shows the change of the maximum injectable time InjMax and the dotted line shows the change of the requested injection time InjT per one cylinder when an alcohol fuel is not blended. FIG. 10C shows the change of the throttle opening degree responding to a control value THfin.

As shown in FIGS. 10A-10C, the maximum injectable time InjMax lowers as the engine speed increases due to the increase of the accelerator stroke, and increases as the engine speed decreases. Then, when the maximum injectable time InjMax lowers as the engine speed increases and the time t4 comes, the requested injection time InjT comes to be larger than the maximum injectable time InjMax because an alcohol fuel is blended with gasoline.

At the time of t4, the determination at Step S16 shifts from negative determination to positive determination. Then, as long as the state of the positive determination of the expression InjT>InjMax continues, the control value THfin decreases gradually every time by the value $\alpha$ in the processes at Step S43 and other steps and the throttle opening degree lowers gradually. Then the actual intake air flow rate decreases and the actual air-fuel ratio comes close to the target air-fuel ratio accordingly. Consequently, the fuel correction value CmpAf at Step S13 decreases and the requested injection time InjT decreases. As a result, the determination at Step S16 shifts from positive determination to negative determination and the control value THfin maintains a balanced value so that the expression "InjT=InjMax" may be satisfied. Such a balanced state continues from the time t5 to the time t6.

Thereafter, when the maximum injectable time InjMax increases as the engine speed lowers due to the decrease of the accelerator stroke and the time t6 comes, the requested injection time InjT comes to be smaller than the maximum injectable time InjMax and the determination at Step S16 continues to be negative determination.

Successively, when the requested injection time InjT exceeds the maximum injectable time InjMax again because of the increase of the accelerator stroke, as shown with the dashed-dotted line in FIG. 10C, the throttle opening degree lowers and restrained so as to take the value of the stored history correction quantity $\Delta THM$.

The following excellent advantages are obtained in the present embodiment described above in detail.

(1) The mixing ratio that is the ratio of gasoline to an alcohol fuel is computed on the basis of the history correction quantity ΔTHM that is the maximum value of the correction quantity ΔTH (the magnitude of correction) that is the deviation between the control value THfin as the opening degree after correction and the basic requested opening degree THBase corresponding to an accelerator stroke. Consequently, it is possible to compute (estimate) the mixing ratio of the gasoline to the alcohol fuel without an alcohol concentration sensor to detect the concentration of an alcohol fuel.

(2) When the requested injection time InjT exceeds the maximum injectable time InjMax because an alcohol fuel is blended with gasoline, the throttle opening degree is lowered and restricted. Consequently, the actual intake air flow rate comes to be lower than the requested intake air flow rate computed in accordance with an accelerator stroke. As a result, it is possible to suppress that the actual air-fuel ratio deviates from the target air-fuel ratio (for example the stoichiometric air-fuel ratio) toward the side of a lean air-fuel ratio even in the undesirable cases where a fuel of a quantity that gives an optimum air-fuel ratio cannot be injected.

(3) In the case of lean burn combustion, because the combustion state is destabilized, it is concerned that HC and $O_2$ flowing in the catalyst 31 increase and are combusted in the vicinity of the catalyst 31 and resultantly the temperature of the catalyst 31 rises and the catalyst 31 deteriorates. In contrast, in the present embodiment, the air-fuel ratio is prevented from deviating toward the side of the lean air-fuel ratio as stated above and hence the above concern can be avoided.

(4) When the determination is once switched from the determination that opening degree restraint correction command exists to the determination that opening degree restraint correction command does not exist (YES at Step S45), the history correction quantity ΔTHM at the time is stored (Step S47). Thereafter, when the opening degree restraint correction command exists afterward (YES at Step S42), the basic requested opening degree THBase is decreased by the stored history correction quantity ΔTHM without the computation of the correction quantity ΔTH (Step S44). Consequently, the state of degeneracy operation wherein the actual intake air flow rate is smaller than the requested intake air flow rate responding to an accelerator stroke continues. Then, since the degeneracy operation state is an operation state where an output torque corresponding to an accelerator stroke is not obtained, it is possible to make a driver who manipulates an accelerator pedal realize abnormality.

(5) During the time period when the requested injection time InjT exceeds the maximum injectable time InjMax (t4 to t5 and t6), the correction for reducing and restricting the throttle opening degree continues and hence the actual air-fuel ratio can come close to the target air-fuel ratio (for example the stoichiometric air-fuel ratio).

Fourth Embodiment

In the present embodiment, when the engine speed exceeds the upper limit NEL, an overrun fuel cutting control for fully closing the throttle opening, cutting the injection of a fuel from the fuel injector 19, and thus reducing the engine output (refer to Step S61 in FIG. 12) is executed. Meanwhile, in the aforementioned third embodiment, the intake air flow rate is reduced by applying opening degree restraint correction to reduce the throttle opening degree and the determination at Step S16 is prevented from being switched to positive determination by reducing the requested injection time InjT. In contrast, in the present embodiment, the upper limit NEL used in the overrun fuel cutting control is lowered, thereby the requested injection time InjT is reduced, and resultantly the determination at Step S16 is prevented from being switched to positive determination.

Figure 11:
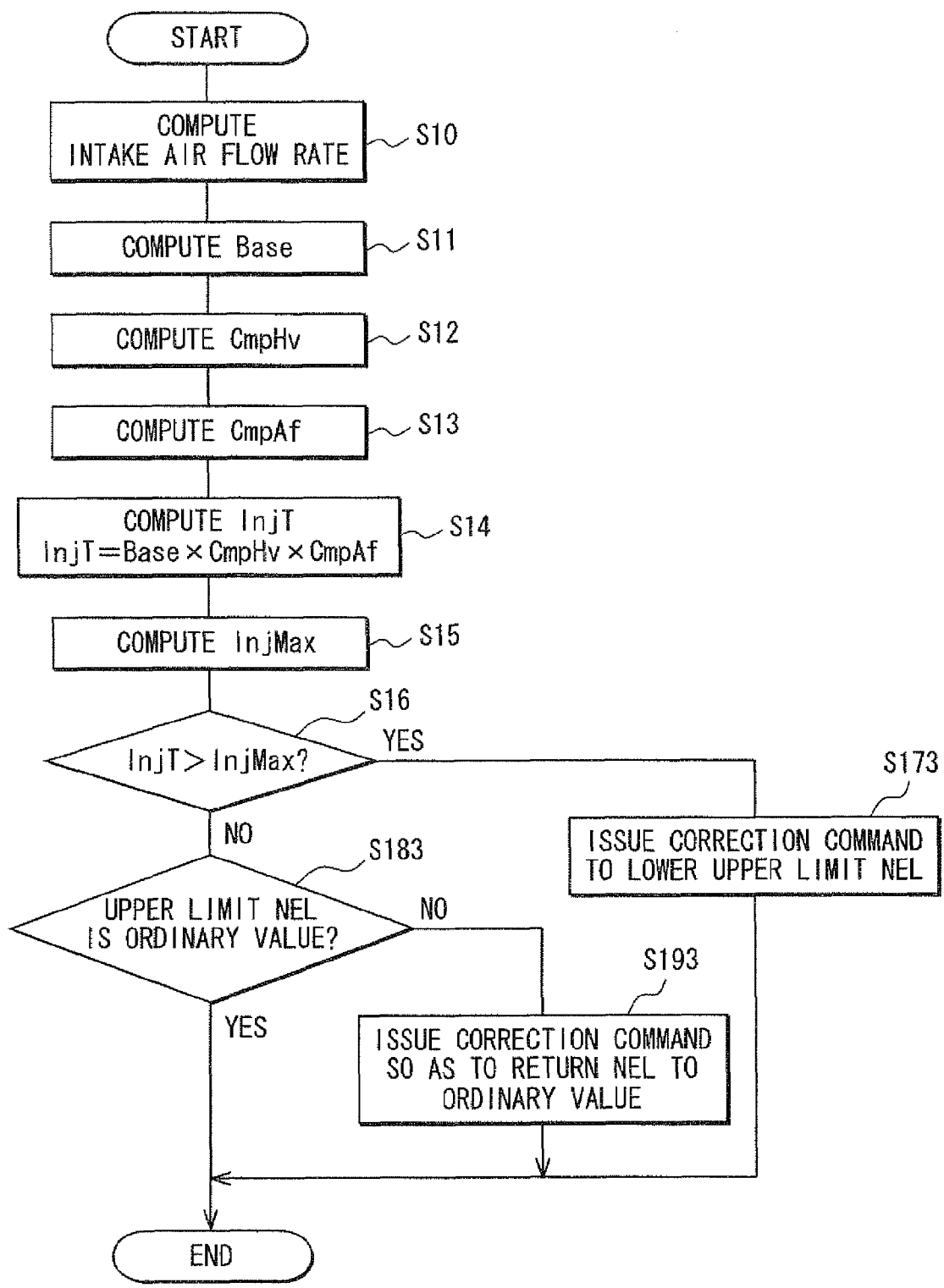
FIG. 11 is a flowchart showing the control procedure with an ECU according to a fourth embodiment.
Figure 12:
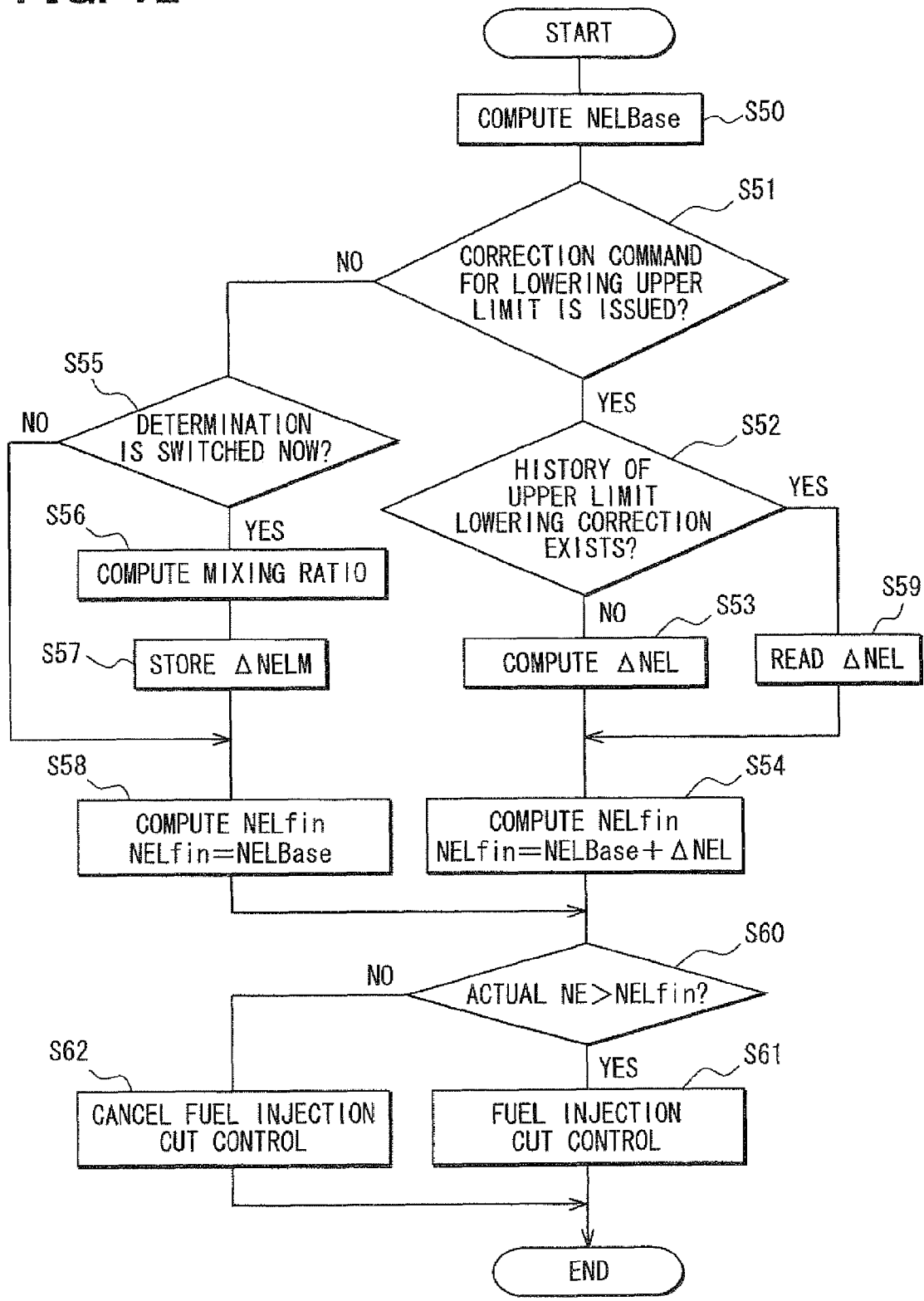
FIG. 12 is a flowchart showing a pump control routine according to the fourth embodiment.

FIGS. 11 and 12 are flowcharts showing the procedure of the fuel injector 19 controlled with the ECU 40 according to the present embodiment and the same codes are named to the steps of the same processes as shown in FIGS. 2 and 3 and the same explanations are used. Further, the configuration of the present embodiment is the same as the first embodiment.

As shown in FIG. 11, when it is positively determined that the requested injection time InjT exceeds the injectable time InjMax at Step S16, the procedure proceeds to Step S173 and correction command is issued so as to lower the upper limit NEL used in the overrun fuel cutting control. On the other hand, when the determination is negative at Step S16, the procedure proceeds to Step S183 and it is determined whether the upper limit NEL is the ordinary value. When it is determined that the upper limit NEL is not the ordinary value (NO at Step S183), correction command is issued so as to return the upper limit NEL to the ordinary value at the succeeding Step S193.

In the process shown in FIG. 12, at Step S50, an ordinary upper limit NELBase (an ordinary value) is read out. Successively at Step S51, it is determined whether the correction command for lowering the upper limit is issued at Step S173 on the basis of a flag.

When it is determined that the upper limit lowering correction command exists (YES at Step S51), whether or not the history of the upper limit lowering correction exists is determined at the succeeding Step S52. When it is determined that the upper limit lowering correction history does not exist (NO at Step S52), at Step S53, the decrement ΔNEL of the upper limit NEL is computed on the basis of the following computation formula;

$$\Delta NEL = \text{Previous } \Delta NEL - \beta$$

wherein, the value β in the computation formula is fixed to a predetermined value.

At the succeeding Step S54, the final upper limit NELfin is computed on the basis of the following computation formula;

$$P\text{fin} = \text{Ordinary upper limit } NEL\text{Base} - \text{Decrement } \Delta NEL$$

The drive of the fuel injector 19 is controlled so that the upper limit may come to the final upper limit NELfin.

When it is determined that the upper limit lowering correction command does not exist (NO at Step S51), the procedure proceeds to Step S55 and whether or not the determination at Step S51 is now switched from positive determination to negative determination is determined. When it is determined that the determination is now switched (YES at Step S55), the mixing ratio that is the ratio of gasoline to an alcohol fuel is computed with a graph at Step S56. The graph used here is prepared by storing beforehand the relationship between the decrement ΔNEL of the upper limit NEL and the mixing ratio. The mixing ratio is computed so that the mixing ratio of the alcohol fuel may increase as the decrement ΔNEL increases.

At Step S57, the decrement ΔNEL and the previous decrement ΔNEL are compared with each other and the larger value of them is stored as a history decrement ΔNELM. Here, the history decrement ΔNELM thus stored is erased when an ignition switch is turned off. Otherwise, the history decrement ΔNELM may be set so as to be erased when a fuel is fed to the fuel tank 19T. Still otherwise, the history decrement ΔNELM may be stored and maintained without being erased.

Whether or not a fuel is supplied may be determined on the basis of signals output from a detector 38 to detect the opening and closing of a refueling cap (refer to FIG. 1) or signals output from a detector to detect the residual quantity of the fuel in the fuel tank.

At Step S58, the final upper limit NELfin is used as the ordinary upper limit NELBase. When it is determined that the determination is not switched now at Step S55 (NO at Step S55), the procedure proceeds to Step S58 without the computation of the mixing ratio at Step S56 and the process of adopting the final upper limit NELfin as the ordinary upper limit NELBase is executed.

When the history is stored at Step S57, it is determined that the history of upper limit lowering correction exists at Step S52 and on this occasion the stored history decrement ΔNELM is set as the decrement ΔNEL at Step S59. That is, when the determination is once switched from the determination that upper limit lowering correction command exists to the determination that upper limit lowering correction command does not exist (YES at Step S55), the history decrement ΔNELM at the time is computed (Step S56) and stored (Step S57). When the upper limit lowering correction command exists afterward (YES at Step S52), the ordinary upper limit NELBase is decreased by the stored history decrement ΔNELM without the computation of the decrement ΔNEL (Step S54).

At Step S60, the actual engine speed NE and the final upper limit NELfin are compared with each other. When it is determined that the expression NE>NELfin is satisfied (YES at Step S60), fuel injection cutting control is carried out at Step S61. When it is determined that the expression NE>NELfin is not satisfied (NO at Step S60), the fuel injection cutting control is cancelled and the drive of the fuel injector 19 is controlled on the basis of the requested injection time InjT at Step S62.

An embodiment according to the processes shown in FIGS. 11 and 12 is hereunder explained in reference to FIGS. 13A and 13B. The dotted line in FIG. 13A shows the change of the upper limit NEL of an overrun fuel cutting control and the solid line shows the change of the engine speed NE. The solid line in FIG. 13B shows the change of the maximum injectable time InjMax and the dotted line shows the change of the requested injection time InjT per one cylinder when an alcohol fuel is not blended.

As shown in FIGS. 13A and 13B, the maximum injectable time InjMax lowers as the engine speed increases due to the increase of the accelerator stroke, and increases as the engine speed decreases. Then, when the maximum injectable time InjMax lowers as the engine speed increases and the time t7 comes, the requested injection time InjT comes to be larger than the maximum injectable time InjMax because an alcohol fuel is blended with gasoline.

At the time of t7, the determination at Step S16 shifts from negative determination to positive determination. Then, as long as the state of the positive determination continues, the upper limit NELfin decreases gradually every time by the value β in the processes at Step S53 and other steps and the upper limit NEL lowers gradually. Then the maximum injectable time InjMax increases as the engine speed NE lowers due to the fuel injection cutting control As a result, the determination at Step S16 shifts from positive determination to negative determination and the final upper limit NELfin maintains a balanced value so that the expression InjT=InjMax may be satisfied. Such a balanced state continues from the time t8 to the time t9

Thereafter, when the maximum injectable time InjMax increases as the engine speed NE lowers due to the decrease of the accelerator stroke and the time t9 comes, the requested injection time InjT comes to be smaller than the maximum injectable time InjMax and the determination at Step S16 continues to be negative determination.

Successively, when the requested injection time InjT exceeds the maximum injectable time InjMax again because of the increase of the accelerator stroke or the like, the upper limit NEL lowers and restrained so as to take the value of the stored history decrement ΔNELM.

The following effects are obtained also in the present embodiment described above in detail in the same way as the aforementioned third embodiment.

(1) The mixing ratio that is the ratio of gasoline to an alcohol fuel is computed on the basis of the history decrement ΔNELM that is the maximum value of the decrement ΔNEL (the magnitude of correction) of the upper limit NEL. Consequently, it is possible to compute (estimate) the mixing ratio of the gasoline to the alcohol fuel without an alcohol concentration sensor or the like to detect the concentration of an alcohol fuel.

(2) When the requested injection time InjT exceeds the maximum injectable time InjMax, the final upper limit NELfin of the fuel injection cutting control is lowered. Consequently, the frequency of the cases where the engine speed NE increases to a high speed exceeding the upper limit NEL reduces. Hence the frequency of the cases where the maximum injectable time InjMax shortens to the extent that the positive determination is made also reduces. As a result, it is possible to suppress that the air-fuel ratio deviates from the optimum value toward the side of a lean air-fuel ratio even in the undesirable cases where a fuel of a quantity that gives an optimum air-fuel ratio to a requested intake air flow rate cannot be injected.

(3) In the case of lean burn combustion, because the combustion state is destabilized, it is concerned that HC and $O_2$ flowing in the catalyst 31 increase and are combusted in the vicinity of the catalyst 31 and resultantly the temperature of the catalyst 31 rises and the catalyst 31 deteriorates. In contrast, in the present embodiment, the air-fuel ratio is prevented from deviating toward the side of the lean air-fuel ratio as stated above and hence the above concern can be avoided.

(4) When the determination is once switched from the determination that upper limit lowering correction command exists to the determination that upper limit lowering correction command does not exist (YES at Step S55), the history decrement ΔNELM at the time is stored (Step S57). Thereafter, when the upper limit lowering correction command exists afterward (YES at Step S52), the ordinary upper limit NELBase is decreased by the stored history decrement ΔNELM without the computation of the decrement ΔNEL (Step S54). Consequently, the state of degeneracy operation wherein the actual intake air flow rate is smaller than the requested intake air flow rate responding to an accelerator stroke continues. Then, since the degeneracy operation state is an operation state where an output torque corresponding to an accelerator stroke is not obtained, it is possible to make a driver who manipulates an accelerator pedal realize abnormality.

(5) During the time period when the requested injection time InjT exceeds the maximum injectable time InjMax (t7 to t8 and t9), the overrun fuel cutting control continues and hence the air-fuel ratio can come close to the target air-fuel ratio (for example the stoichiometric air-fuel ratio).

Other Embodiments

The present invention is not limited to the contents described in the aforementioned embodiments and may be modified as stated below. Further, the specific structural features of each of the embodiments may arbitrarily be combined with each other.

It is also possible to determine only whether an alcohol fuel is blended in place of Step S26 in FIG. 3, Step S36 in FIG. 7, Step S46 in FIG. 9, or Step S56 in FIG. 13.

More specifically, it may be determined that there is the possibility that an alcohol fuel is blended when it is determined that correction command of load-up is issued at Step S31 (NO at Step S31). Otherwise, it may be determined that there is the possibility that an alcohol fuel is blended when it is determined that opening degree restraint correction command is issued at Step S41 (NO at Step 41). Still otherwise, it may be determined that there is the possibility that an alcohol fuel is blended when it is determined that upper limit lowering correction command is issued at Step S51 (NO at Step 51).

It is also acceptable: to employ a device that can change a threshold value functioning as a relief pressure as the pressure regulator 19c (a relief valve) shown in FIG. 1; and to make it possible to set the threshold value with the ECU 40. Further, a means for raising the threshold value may be employed in place of a means for raising the target fuel pressure P in the event of load-up operation in the second embodiment. On this occasion, it is possible to estimate a load-up quantity on the basis of the raised threshold value and the time and compute a mixing ratio on the basis of the estimated load-up quantity.

Further, in place of the employment of the pressure regulator 19c that can change a threshold value as stated above, it is also possible to: employ a pressure regulator 19c wherein a threshold value functioning as a relief pressure is fixed; and alternately use two pressure regulators 19c having threshold values different from each other. Then the pressure regulators 19c may be switched to the pressure regulator 19c having a higher relief pressure when the aforementioned load-up operation is carried out. On this occasion, it is possible to estimate the load-up quantity on the basis of the raised threshold value and the time and compute a mixing ratio on the basis of the estimated load-up quantity.

Although a spark ignition internal combustion engine such as a gasoline engine is intended as the internal combustion engine in the above embodiments, a compression ignition internal combustion engine such as a diesel engine may also be intended.

Although a port injection type engine 10 wherein a fuel injector 19 is attached to an intake manifold 18 or an intake pipe is intended in the above embodiments, a direct fuel-injection engine 10 wherein a fuel injector 19 is attached to a cylinder head and a fuel is directly injected into a combustion chamber 23 may be intended. However, whereas the maximum injectable crank angle of about 700° CA can be secured in the crank angle of 720° CA per one combustion cycle in the case of the port injection type, in the case of a direct fuel-injection type, the maximum injectable crank angle is smaller than the case of the port injection type and hence the requested injection time InjT exceeds the injectable time InjMax even though only a small amount of alcohol fuel is blended. Consequently, it is estimated that the effects of the above embodiments are still exhibited even in the case of a direct fuel-injection engine 10.

Although the throttle opening degree is on the fully closed side and the fuel injection is cut at Step S61 in the above fourth embodiment, the overrun control means according to the present invention is not limited to such fully closed and cut case. Then for example, it is also possible to restrain the throttle opening degree so as to be kept at a prescribed level or lower and also the fuel injection quantity so as to be kept at a prescribed level or lower.

What is claimed is:
1. A fuel estimating device, comprising:
a requested injection time computation means for computing a requested injection time that is necessary for a fuel injector to inject a fuel per one combustion cycle in response to an operation amount of an accelerator;
an injectable time computation means for computing an injectable time per one combustion cycle on the basis of a rotation speed of an output shaft of an internal combustion engine, and
a determination means for determining whether the requested injection time is greater than the injectable time, wherein
it is estimated that an alternate fuel other than a regular fuel is blended with a fuel in a fuel tank when the determination means determines that the requested injection time is greater than the injectable time.
2. A fuel estimating device according to claim 1, further comprising:
a fuel pump control means for controlling a fuel pump to feed a fuel to the fuel injector and executing a load-up operation of the fuel pump so as to increase the feed pressure of the fuel when the determination means determines that the requested injection time is greater than the injectable time; and
a mixing ratio estimation means for estimating a mixing ratio of the regular fuel to the alternate fuel based on a load-up quantity of the fuel pump caused by continuing the load-up operation until the determination means determines that the requested injection time is not greater than the injectable time after the determination means determines that the requested time is greater than the injectable time.
3. A fuel estimating device according to claim 2, wherein:
the fuel pump control means controls the fuel pump with a duty signal and executes the load-up operation by increasing a duty ratio of the duty signal; and
the mixing ratio estimation means estimates the mixing ratio based on an increment of the duty ratio by the fuel pump control means.
4. A fuel estimating device according to claim 2, wherein:
the fuel pump control means controls the fuel pump so that a feed pressure of the fuel is brought to a target pressure and executes the load-up operation by increasing the target pressure; and
the mixing ratio estimation means estimates the mixing ratio based on an increment of the target pressure.
5. A fuel estimating device according to claim 1, further comprising:
a requested opening degree computation means for computing a requested degree of opening of an intake air flow rate control valve based on a requested intake air flow rate responding to the operation amount of the accelerator;
an opening degree correction means for subtractively correcting the requested degree of opening of the intake air flow rate control valve when the determination means determines that the requested injection time is greater than the injectable time; and
a mixing ratio estimation means for estimating a mixing ratio of the regular fuel to the alternate fuel based on a subtractive correction quantity of the intake air flow rate control valve caused by continuing a subtractive correction until the determination means determines that the requested injection time is not greater than the injectable time after the determination means determines that the requested time is greater than the injectable time.

6. A fuel estimating device according to claim 1, further comprising:
   an overrun control means for lowering an output of the internal combustion engine when the rotation speed of the output shaft of the internal combustion engine exceeds an upper limit;
   an upper limit correction means for subtractively correcting the upper limit when the determination means determines that the requested injection time is greater than the injectable time; and
   a mixing ratio estimation means for estimating a mixing ratio of the regular fuel to the alternate fuel based on a subtractive correction quantity of the upper limit caused by continuing the subtractive correction until the determination means determines that the requested injection time is not greater than the injectable time after the determination means determines that the requested time is greater than the injectable time.

* * * * *